United States Patent [19]

Grover

[11] 3,906,197

[45] Sept. 16, 1975

[54] APPARATUS AND METHODS FOR COMPUTER GRAPHICS

[75] Inventor: Derrick John Grover, Roydon, England

[73] Assignee: National Research Development Corporation, London, England

[22] Filed: Mar. 5, 1974

[21] Appl. No.: 448,362

[30] Foreign Application Priority Data

Mar. 9, 1973 United Kingdom ............... 11433/73

[52] U.S. Cl. ............. 235/151; 340/225; 340/324 A

[51] Int. Cl.[2] ........................................ G06K 15/20

[58] Field of Search ......... 340/225, 324 A; 235/151

[56] References Cited

UNITED STATES PATENTS 3,597,759 8/1971 Hause ............................ 340/324 A

*Primary Examiner*—Eugene G. Botz

*Attorney, Agent, or Firm*—Cushman, Darby & Cushman

[57] ABSTRACT

Apparatus for carrying out a spatial transform between information in two displays is described. Where one display is a graphical input tablet with an overlay forming graduations for the tablet, a point may be selected using a stylus and a corresponding point for example in a C.R.T. display may be intensity emphasized. The co-ordinates of the selected point are combined and the resulting number is compared with a number related to the position of a data item in a series of such items giving rise to the C.R.T. display. The positions of the data items in the series are arranged to give the required spatial transform when the number relating to position in the series equals the number formed by combining the co-ordinates of a selected point.

21 Claims, 13 Drawing Figures

APPARATUS AND METHODS FOR COMPUTER GRAPHICS

Figure 1:
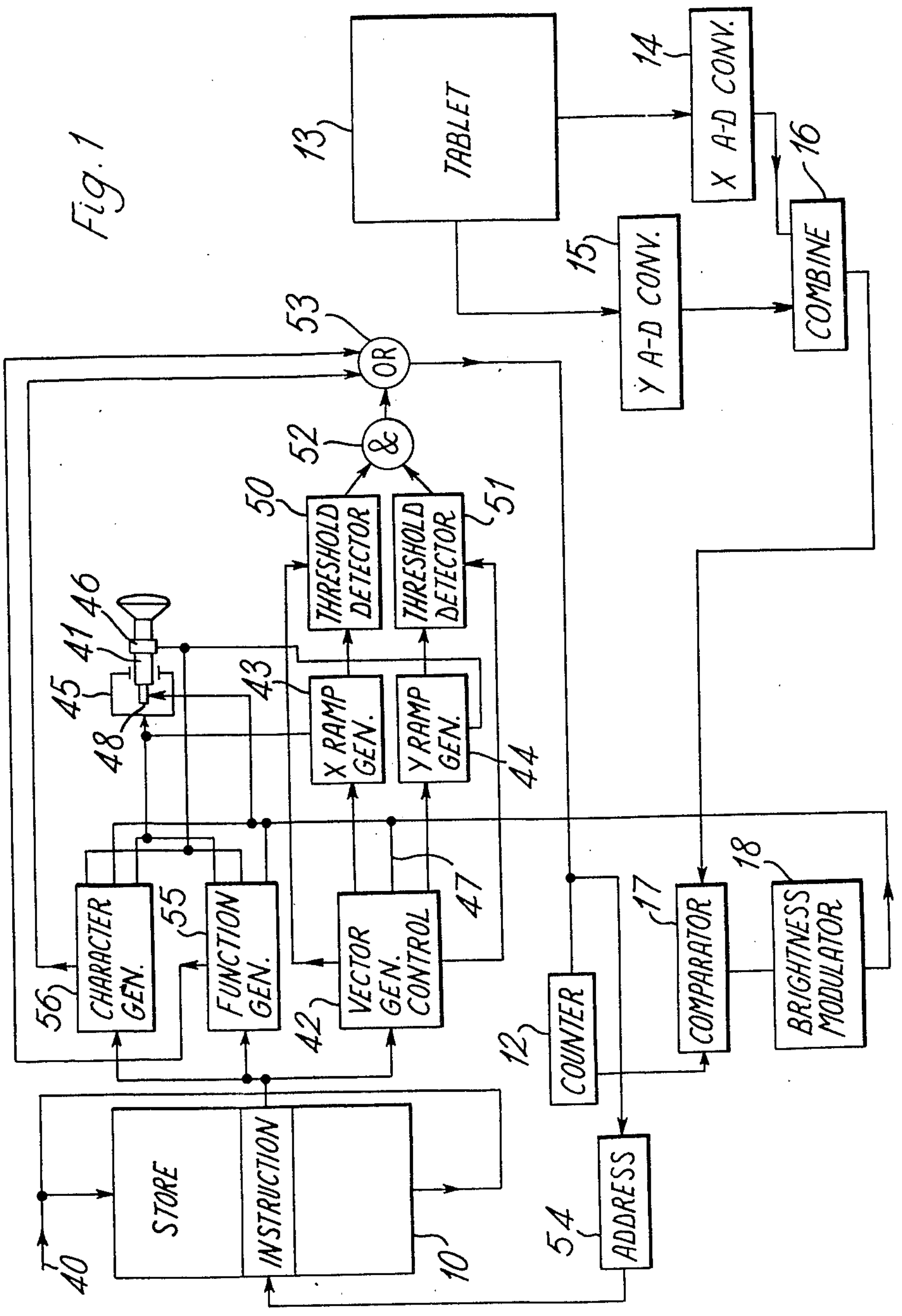

The present invention relates to apparatus and methods for carrying out spatial transforms between information presented visually in two different areas.

Association of data in different formats may be achieved by software incorporating a look-up table, an indexing system or one of the more complex data structures. Each of these methods requires on line access to a computer and is likely to involve extensive software.

According to a first aspect of the present invention there is provided apparatus for carrying out spatial transforms including a first store for data, first multidimensional display means, coupled to the store, for receiving items of data from the store and providing a first display in accordance with the items received, at least one further multi-dimensional display means for providing a further display which is different from the first display but is related thereto, selection means for selecting one portion of one of the displays, correlation means for determining which portion if any, of at least one of the other displays has a predetermined correlation with a portion of the said one display selected using the selection means, and means, coupled to the correlation means, for emphasising any portion of the said one other display which has the predetermined correlation with a selected portion of the said one display.

Each multi-dimensional display means is usually a two dimensional display but examples of display means with further dimensions are mentioned later.

Often one only further display means is provided and it is on this display that a portion is selected. The further display is then in the form of a static display indicating the values of co-ordinate signals generated by input means, such as graphical input tablet, the input means then being included in, the selection means. Alternatively one or all the further display means may be provided from data items read from a store.

More than one portion of each display may bear the predetermined correlation to the selected portion and all these portions may then be emphasised.

Each item of data is preferably sufficient to allow the display means to provide a portion of the first display, and the apparatus includes means for identifying the items of data by providing an identifying signal associated with each item. The correlation means may then include comparison means for comparing the co-ordinate signals with the identifying signals to indicate if the predetermined correlation exists.

According to a second aspect of the present invention there is provided apparatus for carrying out spatial transforms, including a store for data, display means, coupled to the store, for serially receiving items of data from the store and providing a display in accordance with the items received, each item being sufficient to allow the display means to provide a portion of the display, means for identifying the items of data by providing an identifying signal associated with each item, input means for generating signals representing the co-ordinates of points in an area, or space, or n-dimensional hyperspace, comparison means for comparing the signals representing co-ordinates with the identifying signals to indicate if a predetermined correlation exists, and means, coupled to the comparison means, for emphasising those portions of the display displayed in accordance with items of data having the predetermined correlation with current co-ordinate signals.

Such apparatus does not require the use of a computer, off line or on line, and as will be seen has a modest hardware requirement.

The display means preferably includes a display device, such as a cathode-ray tube which requires to be periodically refreshed and the comparison of signals then usually occurs once every refresh cycle. However where emphasis is to be by flashing, timing means may be included for example to enable the comparison means at intervals only or the comparison means may enable the timing means to emphasize periodically.

Where a cathode-ray tube and some similar devices are used the "brightness" of the display can usually be reduced to a level where no display is visible. Hence in this specification the term "display means for providing a display in accordance with the received items" includes display means where the display may not be visible although it is latent in that most conditions for display are fulfilled and on fulfilling the others, when emphasis is required, the portion of the display to be emphasized becomes visible. For example with a CRT the emphasis may be by Z modulation, that is by brightness, the whole display being too dark to be seen except where emphasized. Another convenient form of emphasis has already been mentioned, that is "flashing" where the required display portion varies periodically in brightness.

Where the display means is to be periodically refreshed the data store may include a magnetic disc, a delay line store, that is with information circulating by means of a feedback path, or a MOS shift register similarly connected.

The display means may include a display device, such as a storage tube or an X-Y plotter, where information is read from the data store once only. A control signal for emphasis is generated by the comparison means, immediately prior to the display of the portion constructed from that item of data whose identifying signal correlates with current co-ordinate signals.

The items of data may be in several forms, some simple examples of which are: pairs of single or multi bit numbers, each pair specifying the co-ordinates of a point; or pairs of single or multi bit numbers, each pair specifying an increment (positive or negative) of co-ordinates; or several multi bit numbers specifying the movement of a point in the display to generate a line or vector; or sub-routines specifying part or the whole, of a complete sub-display or picture; or a mixture of these forms each identified by a code.

The means for identifying the data items may then include a pulse circuit for providing a pulse each time a new item of data is passed to the display means, a counter for counting the pulses, and means for resetting the counter each time the data for a complete display, or a predetermined number of displays is passed to the display means. The pulse circuit may often be already present in the display means and the pulse emitted thereby may be that used to signal the store to send a further display item.

Where a fixed time is allotted for passing each data item to the display means, the means for identifying the data items may include a clock, preferably in the form of a circuit which emits pulses at regular intervals corresponding to the passing of data items to the display means. The clock is coupled to a counter the output of which is coupled to the comparison means, the clock and counter being reset each time the data for a complete display, or a predetermined number of displays is passed to the display means.

The data items need not be identified according to the order in which they leave the store. For example associative addressing may be used wherein each item of data includes one or more bits known as an associative address. Means are provided for passing this address to a register every time the data item having this address is, or is about to be, displayed. The register takes the place of the above mentioned counter in the means for identifying items of data and when the co-ordinates of the point indicated bear the predetermined correlation to the associative address of an item the display of that item is emphasized.

In this way several portions of the display may be emphasized if each is given the same address and the technique is useful where the data items read out from the store include some items which are not related to the co-ordinates of points in the area or space from which the spatial transform is to be made.

The input means may include a graphical input tablet such as a resistive or capacitive tablet, or a CRT graphical input device. The tablet or CRT device generates the co-ordinate signals for a point when a user indicates that point with a stylus or light pen, for example. An example of a suitable resistive tablet is described in U.K. Pat. No. 1,310,683, and other tablets are described in the Proceedings of the Fall Joint Computer Conference 1964 at pages 819 to 830 in a paper by Davis and Ellis entitled "The Rand Tablet a Man Machine Graphical Communication Device" and the IEEE trans. on Elec. Computers, Vol. C. 19th June 1970 at pages 546 to 548 in a paper Brenner and Bruyne entitled "A Sonic Pen: A Digital Stylus System."

Where the co-ordinate signals represent polar co-ordinates, the input device may be of the type which has a stylus mounted on an arm, the distance of the stylus along the arm determining one co-ordinate signal and the angle of the arm the other co-ordinate signal.

The input means may include a device which generates the co-ordinate signals of the point without the point being indicated on the said area. For example two graduated potentionmeters may be set manually to generate the respective co-ordinate signals, or the co-ordinates of the point may be obtained from a punched card by means of a card reader.

To generate the co-ordinates of a point in space or hyperspace having a number of dimensions *n*, the input means is elaborated. For example a stylus may be fixed to an arm so that twisting of the stylus and its effective height may be used to provide two more dimensions. With the manually set potentiometers or card reader it is clear that as many more dimensions as are desired may be added.

An overlay is usually required for the tablet to indicate the significance of different portions of the tablet. Where the stylus has to make electrical contact with the tablet surface, an underlay may be used instead provided the working surface of the tablet is transparent. In some circumstances it may be preferable to use an optically projected image to form the "overlay."

The input means may include analogue to digital converters, where necessary, coupled at the output of the tablet or CRT device, to convert the co-ordinate signals into digital form. Means for generating words by combining the digital co-ordinate signals for each indicated point may then be provided.

The predetermined correlation may then be one of equality between the number held by the counter and the word, or, as is explained below, part of this number with one or more most or least significant bits omitted. The layout of the overlay and the order in which data items are held in the store are so arranged that by indicating a point in the overlay, co-ordinate signals are generated which form a word numerically equal to, or part of which is numerically equal to, the operation number of the associated portion of the display.

The spatial input means may include a storage tube wherein the indication of a point is by a cursor or spatial indicator which is not stored. This non-storage is achieved by a fast moving electron beam and cursor forms which are suitable take the form of, for example, orthogonal lines meeting at the point to be indicated, or a small circle round the point. Hence the indication of a point with this form of input means is carried out electronically. The "overlay" may be displayed by the tube in the storing mode and since the cursor is continually refreshed spatial transforms from the display means to the input means can be carried out, by indicating a point of the display using, for example, a light pen. The output of the light pen is used to identify the word held by the counter, and the word is divided to provide the co-ordinates of a point, these co-ordinates being passed to the storage tube to position the cursor. Various versions of the storage tube which could be used in the above applications are described in a paper entitled "Storage Tube Graphics a Comparison of Terminals" published in the record of the International Symposium on Computer Graphics 70, at Brunel University, Uxbridge, England.

Returning to the first aspect of the invention, the selection means may include a light pen operating in conjunction with the first display. The correlation means may then include means for holding a signal identifying the item of data giving rise to the current portion of the display, the emphasis means emphasising a portion of one of the further displays in accordance with the signal held. For example the signal held may be divided into two portions and used as the co-ordinate signals for an X-Y plotter or to operate the cursor of a storage tube. Thus a store position to spatial co-ordinate transform is carried out.

In performing one form of store position to store position transform, one of the further displays may be formed by reading data items from a second store clocked at the same times as the store coupled to the first display means. A light pen may then be used to identify that part of one display corresponding to a current data item in one store, and the output of the pen may then be used to emphasise the current portion of the other display corresponding to different data item in the other store - thus achieving a store position to store position transform.

Store position to store position transforms may also be carried out if two means for identifying data items are provided, one for each display, to generate identifying signals for each item. A light pen is used to select one identifying signal, and a comparator is included to compare the selected identifying signal with such signals from the other display. when a predetermined correlation occurs the comparator causes the portion of the display corresponding to the current data item from the said other display to be emphasised.

According to a third aspect of the present invention there is provided a method for carrying out spatial transforms, including forming a display from items of data received serially, each time being sufficient to allow a portion of the display to be formed, identifying each item of data, generating signals representing the co-ordinates of a point in an area, or space, of n-dimensional hyperspace, comparing the identity of each item with the co-ordinate signals, and emphasising those portions of the display resulting from items of data which have a predetermined correlation with the co-ordinate signals for the said point.

Figure 2B:
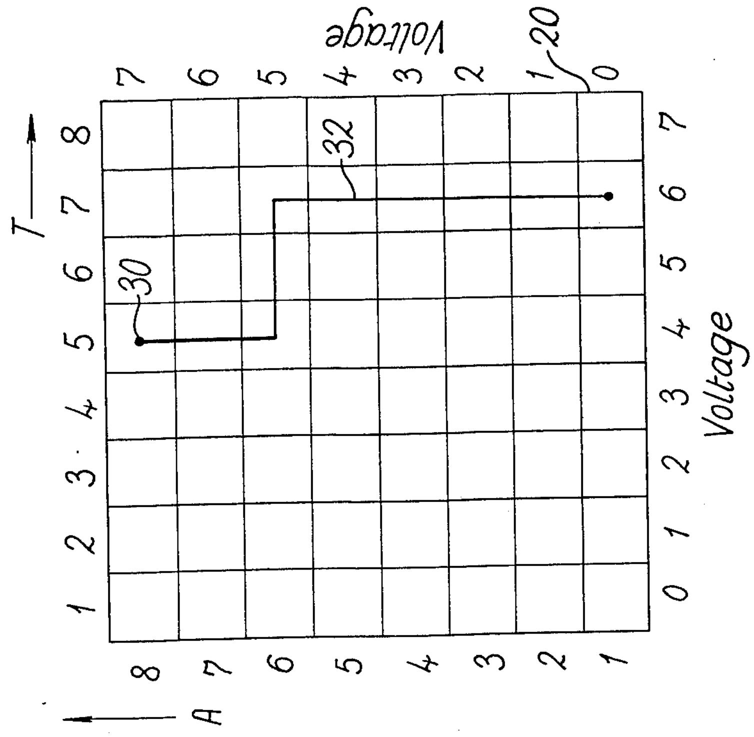
Figure 2A:
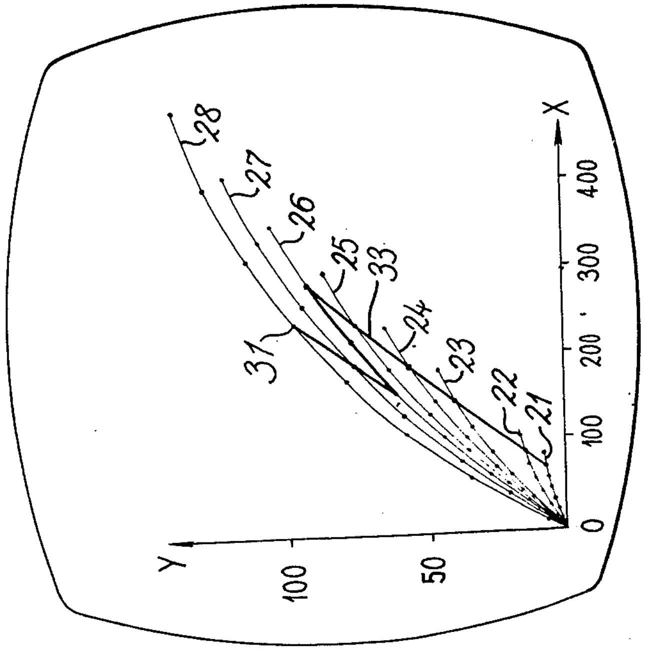

Certain embodiments of the invention will now be described by way of example, with reference to the accompanying drawings, in which:

FIG. 1 is a block diagram of apparatus according to the invention,

FIGS. 2(*a*) and 2(*b*) illustrate use of the apparatus of FIG. 1 for spatial transformation between two independent variables and dependent variables in parametic equations for parabolas.

Figure 3B:
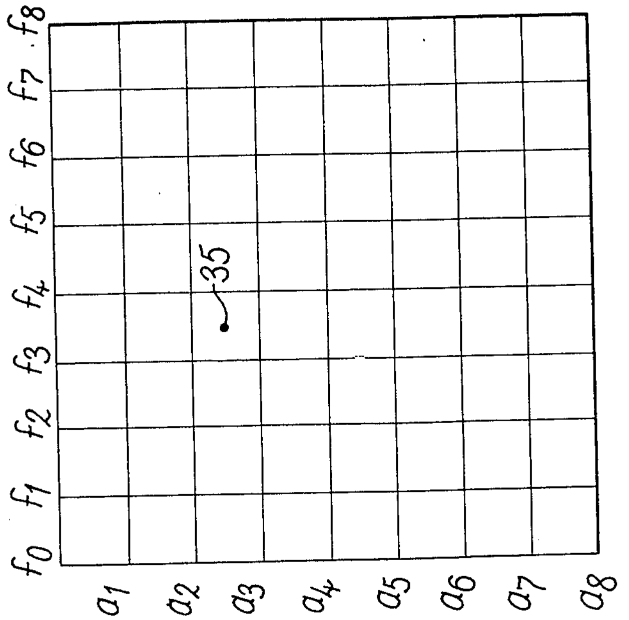
Figure 3A:
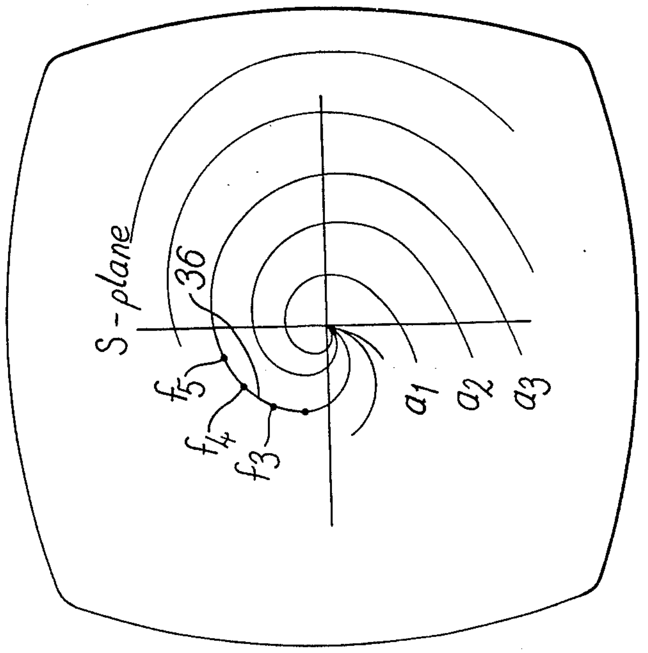
Figure 4B:
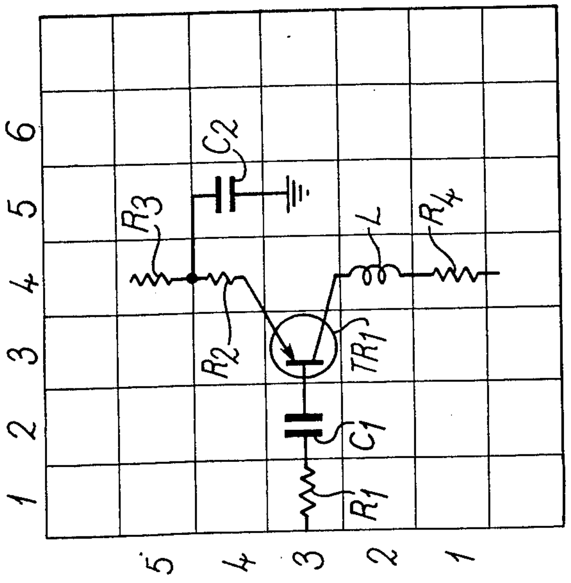
Figure 4A:
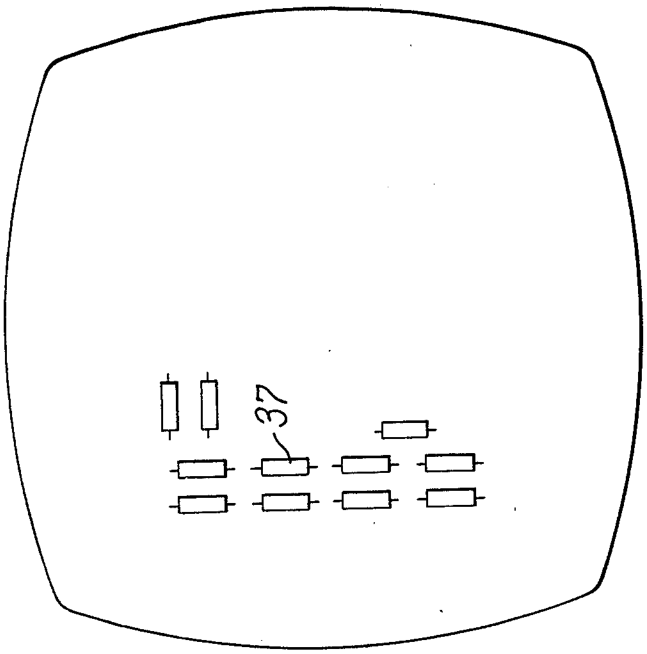
Figure 5:
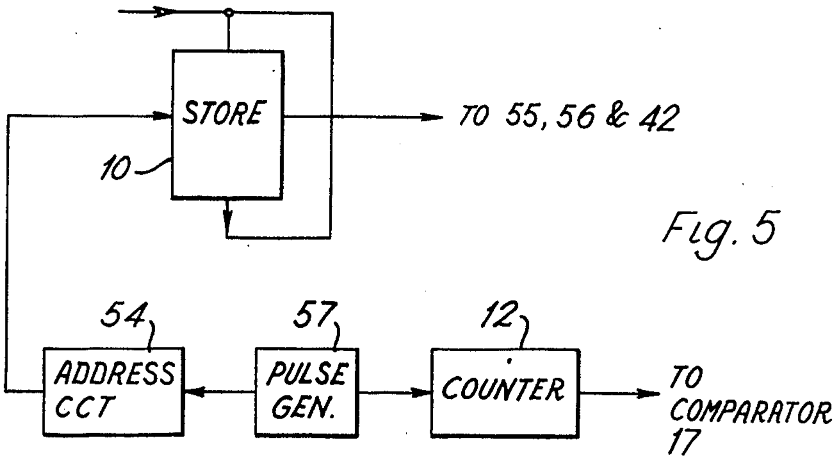
Figure 6:
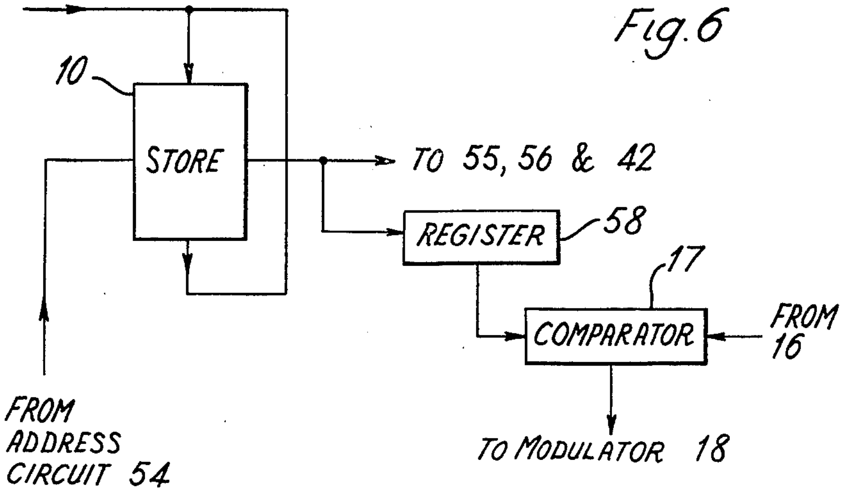
Figure 7:
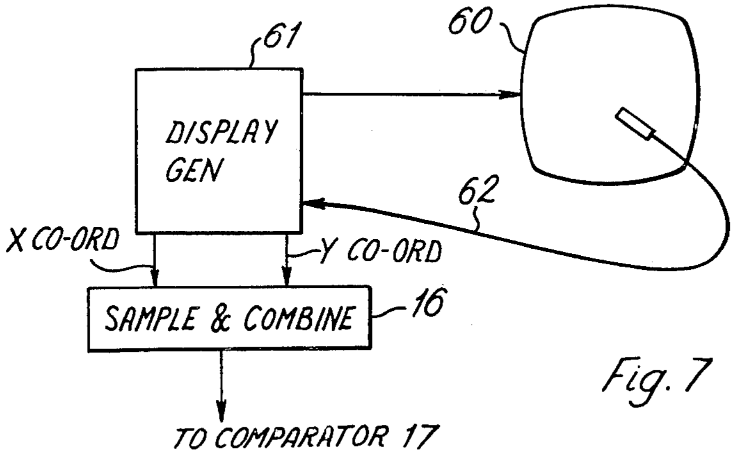
Figure 8:
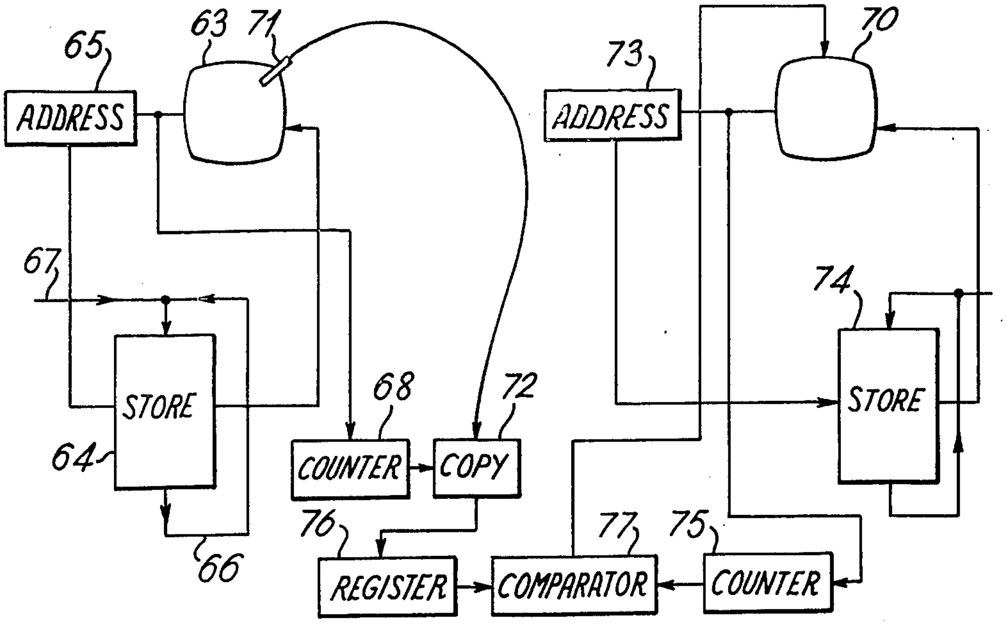
Figure 9:
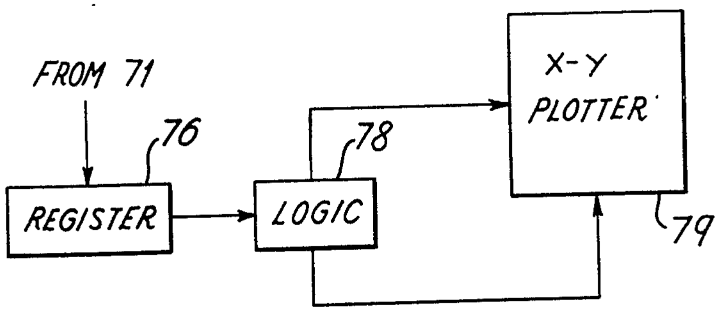
Figure 10:
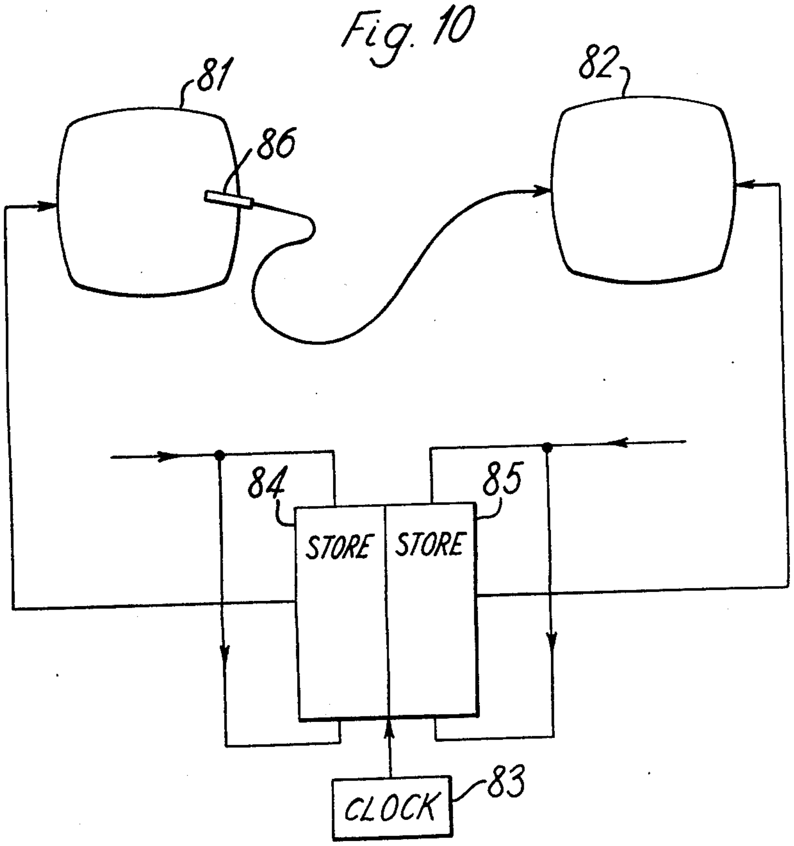

FIGS. 3(*a*) and 3(*b*) illustrate use of the apparatus of FIG. 1 for spatial transformation between frequencies and system characteristics, and a Nyquist plot, FIGS. 4(*a*) and 4(*b*) illustrate use of the apparatus of FIG. 1 for spatial transformation between a circuit diagram and a display of a circuit board, FIG. 5 shows modification which may be made to FIG. 1 to identify data items determining the display in another way, FIG. 6 shows a modification for FIG. 1 when data items contain an identifying portion, FIG. 7 shows a modification for FIG. 1 in which the graphical input tablet is replaced by a cathode ray tube, FIG. 8 illustrates another embodiment of the invention primarily for store position in store position transformations, FIG. 9 shows a modification of FIG. 8 allowing store position to spatial co-ordinate transformations and, FIG. 10 also illustrates an embodiment of the invention for store position to store position transformations.

In FIG. 1 items of data for a complete display are entered by means of a channel 40 into a store 10. The data items held by the store 10 are in the form of instructions which determine the display which appears on the face of a cathode ray tube 41. The instructions held by the store 10 are continuously cycled through the store to allow the display to be refreshed periodically.

The display may be generated in one of three ways. Firstly, an instruction may contain the co-ordinates of the next point in the display and also a "bit" which indicates whether the line (i.e., the vector) joining the current point and the next point is to be displayed. Instructions of this type are passed to a vector generator control 42 which has outputs coupled to an X ramp generator 43 and a Y ramp generator 44. These generators provide linearly changing voltages at a rate which depends upon the size of the increment and these voltages are applied to the X deflection plates 45 and the Y deflection plates 46, respectively of the tube 41. At the same time a signal travels by way of a channel 47 to the electron gun 48 of the tube to control the brightness of the spot so that the line traced out thereby is either visible or not visible depending on whether the instructions represent a line in the display or movement of the spot between points in the display at which one line terminates and another begins. The vector control circuit 42 also passes X and Y reference signals dependent on the co-ordinates of the end of the line being displayed, to threshold detector circuits 50 and 51, respectively. As soon as the voltages from the ramp generators 43 and 44 become equal to the X and Y reference voltages the threshold detectors 50 and 51 open an AND gate 52 to pass a signal through an OR gate 53 to a counter 12. The signal from the OR gate 53 is also passed to an address circuit 54 which causes the next instruction from the store 10 to be passed to the vector generator 42. In this way the succeeding parts of the display are generated.

In generating the display in the second way, instructions written in a second format are passed to a function generator 55 which then generates a series of co-ordinates representing a selected function, one of many including for example a circle, a triangle or a square. These co-ordinates are passed to the cathode ray tube 41 causing the selected function to be displayed. When the last set of co-ordinates have been passed from the function generator to the tube 41 a signal is passed to the OR gate 53 so that the address circuit 54 reads out the next instruction from the store 10.

The third way of generating the displays uses instructions in a third format which are routed to a character generator 56 which again produces a succession of co-ordinates for the tube 41, these co-ordinates being in the form of a sub-routine which generate various characters such as alpha numeric characters. When the co-ordinates for one character have been read out a signal passes by way of the OR gate 53 to the address circuit 54 causing the next instruction to be read out.

It will be seen that in the arrangement of FIG. 1 each instruction read out from the store 10 is identified by a pulse passed to the counter 12, when the complete set of data items of instructions for a display have been read out and the store is ready to recycle the counter 12 is reset to zero.

Display apparatus of the general type discribed are known and one suitable similar display is described in more detail in memorandum 9442-N-129 published by Electronic Systems Laboratory, Massachusetts Institute of Technology, by R. H. Stotz and J. E. Ward on the 9th Mar. 1965 under the title "Operating Manual for the ESL Display Console." The ESL Console would be suitable after interfacing for connection to the store 10 at the point where instructions are sent to command interpretations circuits, or a character generator, or a Straza character generator. A circuit designated is suitable for connection to the counter 12 and there is also an intensity modulation connection which can be used to emphasise part of the display on receipt of a signal generated in a way to be described below.

A graphical input tablet 13 of a type which allows an overlay dividing the tablet surface into segments to be used, is connected to analogue-to-digital converters 14 and 15 to supply signals representing X and Y co-ordinates, respectively, of a point indicated by means for example of a stylus in a particular segment.

Signals from the converters 14 and 15 are combined in a circuit 16 to form a word in which the current Y co-ordinate, in digital form, is followed by the current X co-ordinate, in the same form.

Once in each refresh cycle the number held by the counter 12 and the word held by circuit 16 become equal, provided the maximum number of operations in refreshing the display is greater than the maximum number which can be formed by combining Y and X co-ordinates. In conforming to this condition it is usually necessary for the circuit 16 to omit one or more of the least significant digits in the co-ordinate signals. By selecting the number of operations in each display and/or the size of the number from the circuit 16 the number of positions on the tablet are made to correspond approximately to the number of items on the display, thus allowing full use to be made of the two facilities.

Coincidence between the number from the counter 12 and the word from circuit 16 is detected by a comparator 17, which on coincidence passes a control signal to a brightness modulator 18. As a result the current part of the display is emphasized by an increase in intensity. As has been mentioned other forms of emphasis may be used.

A number of examples of the application for, and the operation of, the apparatus of FIG. 1 are now given.

The first application concerns spatial transforms with mathematical relationships. A parabola is defined by the parametric equation:

$X = AT^2$ $Y = 2AT$

The tablet 13 is provided with an overlay 20 (see FIG. 2($b$)) which is graduated from 1 to 8 along cartesian axes in terms of the two independent variables $A$ and $T$ in the above equation. The store 10 holds data for providing sixty-four points on the face of the cathode ray tube 41, the points being divided into eight groups with the points in each group being on one parabola $Y^2 = 4AX$. Thus eight parabolas 21 to 28 corresponding to values of $A = 1$ to $A = 8$, respectively, are shown in FIG. 2($a$), each with eight points corresponding to values of $T = 1$ to $T = 8$.

As signals corresponding to each display point are read out from the store 10, the count in the counter 12 is increased by one. If the counter 12 counts to the base eight starting from zero the first point in the first line will have the number 0, 0; the second 0. 1, the first point in the parabola 22 1, 0 and so on up to the last point in the parabola 28 7, 7, these points corresponding to the voltages provided by the tablet when a stylus is used to indicate the variable values $A = 1$, $T = 1$; $A = 1$, $T = 2$; $A = 2$, $T = 1$; and $A = 8$, $T = 8$.

Thus if the stylus is used to indicate the point 30 ($A = 8$ $T = 5$) the word 7, 4 corresponding to the voltages at this point will appear at one input to the comparator 17. When the counter 12 reaches instruction 74, that is data item 7, 4 the point 31 will be brightened giving a spatial transform between the two points 30 and 31. A transform of the line 32 is obtained by moving the stylus along the line and as a result points on a line 33 on the display are intensified.

In this example only a relative few points are used for clarity but in practice the resolution obtainable in the display is determined by the capacity of the store 10. Often the resolution obtainable from the tablet will be greater than can be resolved in the display. For example in the arrangement of FIGS. 2($a$) and 2($b$), using the binary system, six digits are required to specify points in the display. Thus if the tablet provides a four digit X and a four digit Y co-ordinate signals, the least significant digit in each such signal is disregarded. In this case the overlay is positioned so that changes in the values of A and T occur where the least significant bit changes from 1 to 0, and preferably the lines on the overlay where such changes occur are sufficiently thick to prevent ambiguity in the co-ordinate signals occurring.

The arrangement of FIGS.2($a$) and 2($b$) employs a counter which is reset to zero (0, 0) but often the counter can only be reset to the number one (0, 1). The voltage output from the tablet at the $A = 1$ $T = 1$ position is then zero and no corresponding number occurs in the counter 12. One possibility is to ignore the $A = 1$ $T = 1$ position so that the spatial transform for that position cannot be obtained. Another is to so position the overlay that the least significant value of $T$ cannot be less than one. It is not then possible to carry on out a transform which requires a continuous progression through all display points since those points which are specified by a zero of $T$ are not available. However, the positions in the store 10 where the data for the display corresponding to the points $A = 1$ to 8 $T = 0$ would have been stored is now available for a command which will not be called in a spatial transform. For example commands for shifts in the display which correspond to the ends of lines on the overlay can be stored in these positions.

Mathematical transforms provide an appropriate use of spatial transform for relating data on different mathematical planes. Thus the Nyquist plot on the S plan can conveniently be displayed by the tube 41 in segments between values of frequency as shown between the frequencies $f_3$, $f_4$ and $f_5$ in FIG. 3($a$). The overlay of FIG. 3($b$) therefore defines the boundaries between segments by designating each vertical line with a frequency, and the system performance, for example gain, is specified by the values $a_1$ to $a_8$. The data for each operation held by the store 10 enables the display to show the vector corresponding to one segment between frequencies. Thus is the stylus is used to indicate a point 35 on the tablet corresponding to a system performance $a_3$ and a frequency in the range $f_3$ to $f_4$; the segment 36 brightens when the counter 12 contains the operation number corresponding to vector $f_3$, $f_4$ and this number is equal to the word formed by combining the co-ordinates of $a_3$ and the frequency range $f_3$ to $f_4$.

The use of spatial transforms for non-mathematical relationships is of considerable interest since there may be a simple relationship between what is depicted on the overlay and the display. Such cases arise in layouts of electrical circuit boards and items on a map. FIGS. 4($a$) and 4($b$) illustrate an example of a circuit diagram overlay while the refreshed display shows the positions of the components on the board.

When the operator indicates a component in the circuit diagram using his stylus, the position of the component on the circuit board is indicated directly thus overcoming one of the major problems in servicing and fault finding. A working installation has the data for the display stored on tape to be entered into an off line display buffer store when required.

Since the spatial positions in the overlay and display are not related by a simple rule, the data in the store 10 is assembled in an order determined by the overlay. For example the resistor $R_4$ in the overlay has the co-ordinates 1, 4which is the lowest number which can appear in the circuit 16, but its position is for instance at the designation 37 in the display. Thus the data for display has to be arranged to commence with the data for displaying the resistor $R_4$.

The map, circuit board, or similar transforms may conveniently be carried out using the associative addressing technique mentioned above since the data items can then be stored in an order which is convenient for the display means and does not require large spot movements.

For many displays, the display of each symbol requires several positions in the store 10. In this situation evey symbol is allocated the same number of store positions where this number is a power of two. When a component is indicated on the overlay its co-ordinates coincide with those of one vector in each symbol and this vector is intensified to emphasize the whole component. Instead the comparator 17 may be arranged to compare only the most significant bits from the counter 12 with suitably arranged numbers from the circuit 16. In this way the whole of a symbol is brightened. For example if each symbol requires up to eight binary digits, the data for the capacitor $C_1$ would have the numbers 3, 2, $0_8$ to 3, 2, $7_8$, where $0_8$ and $7_8$ are numbers to the base 8, and the co-ordinates 32 would cause all the parts of the symbol for the capacitor $C_1$ to be emphasized.

Where the display shows a map, the overlay may for example consist of place names and/or other features.

In the display of FIGS. 2(*a*) and 3(*a*) the spot usually needs only a short incremental movement to take it from its current position to a new position. The display of FIG. 4(*a*) and similar displays are different in that at the start of many portions of the display the spot has to be moved to a new position some distance away from its last position. This greater movement usually requires more data bits than can be accommodated in one position of the store 10. Accordingly even if only one store position is required for each vector or symbol it may be necessary to allocate more than one store position for each such item to accommodate data for large movements at the end of each portion of the display. As before the comparator 17 is so arranged that it does not take account of the least significant bits from the counter 12.

A useful application of the invention occurs where the input device generates polar co-ordinates and the display is easily written in angular sequence, for example as may be the case with a Smith Chart. The data items can then be stored in a sequence determined by the overlay but which also allows the display to be written with few large increments in spot position.

Other examples of applications of the invention include applications where depth information is required; such as in multi layer circuit boards, or in medical work for portraying contours of radiation intensity and it is necessary to know the depth at which various intensities occur. Data for several displays, one for each depth or layer, is cycled through the store but no display is bright enough to be visible. The overlay has one coordinate designated as depth or layer number. Indicating a certain depth on the overlay causes only a portion of one display to be refreshed and shown. These are applications where the *n* dimensions mentioned above and the associated input means are often useful.

Another range of applications occurs where there is sufficient space on a display to provide descriptive designations. The designations can then be given on the overlay and the indication of a designation using the stylus causes part of the display to be emphasised. For example the display may consist of a set of graphs showing the prices of various shares against data. The overlay would then be divided into areas, one for each share. Each area has co-ordinates showing month against day, thus allowing the price of any share on any day to be shown in a way which would be difficult on the display on the graphs.

The display may be divided into a number, for example four, sub-displays each providing a different spatial transform from the input means. In this case the data items for each display are so arranged in the store that the most significant number or numbers appearing in the counter 12 relates to one sub-display only. This number or these numbers are omitted in the comparison made by the comparator 17 and thus the four spatial transforms appear simultaneously.

An alternative way of identifying the instructions read from the store 10 will now be described in connection with FIG. 5. A generator 57 provides pulses at intervals which are separated by the greatest time required for any vector, function or character to be displayed. These pulses are passed to the address circuit 54 and each time one occurs the next instruction is read from the store 10. Since there is no need now to determine when each portion of a display has been shown the AND gate 52 and the OR gate 53 are no longer required. Instead the pulse generator passes pulses direct to the counter 12. Thus each instruction is identified by a number in the counter 12 and this number is compared with the number obtained by combining the co-ordinates from the tablet 13.

The arrangement of FIG. 5 is also useful where the tube 41 is a storage tube and each data item is only read once from the store 10. In this case, of course, the recycling loop around the store 10 is omitted. With such an arrangement it is not satisfactory to wait until after a point has been displayed before comparison is carried out to determine whether emphasis should occur. This problem is overcome in FIG. 5 where the pulse generator passes pulses to the counter 12 which enable the comparison to be carried out immediately before the portion of the display, corresponding to that pulse, is displayed so that this portion can be emphasised as it is displayed.

Each data item in the store 10 may include a portion containing a code identifying that item. In FIG. 6 the portion is read into a register 58 when the remainder of the instruction is passed to one of the circuits 55, 56 or 42, and it is the portion held by the register 58 which is compared with the signal formed by combining the co-ordinates from the tablet 13. In this way several parts of the display can be emphasised in one refresh since they may be given the same identifying code. Although the AND gate 52 and the OR gate 53 are retained to pass signals to the address circuit 54 after each portion of a display has been generated, the counter 12 is omitted.

The display tablet of FIG. 1 may be replaced by a cathode ray tube 60 as shown in FIG. 7. In this case the overlay of the tablet is replaced by a static display on the face of the tube 60, this display being determined by signals passed from a display generator 61 which may be in the same general form as that described for the tube 41 of FIG. 1, to the tube 60. A light pen is used in conjunction with the tube 60, instead of the stylus, to identify points in the display and when the light pen picks up the spot refreshing the display, it passes a signal along a channel 62 to the display generator 61 causing the current co-ordinates of the spot to be passed to the sample and combine circuit 16. This is of course a very well known process and will not be described further here. As before the output of the sample and combine circuit 16 is passed to the comparator 17 and where required one or more of the least significant figures of each co-ordinate may be omitted. A storage tube may be used in the display when only one set of data items is passed to the tube 60 to display the overlay but the display generator also passes information for a non-stored cursor. It is this cursor which is used to select a point and its co-ordinates are passed to the circuit 16. The cursor can be adjusted by manual controls fitted to the display generator.

The apparatus illustrated in FIG. 8 may be used for store position to store position transformations. A display apparatus 63 includes a cathode ray tube and circuits of the type shown in FIG. 1 for generating a display from instructions read out from a store 64 under the control of an address circuit 65 driven from circuits in the display 63. As in FIG. 1 the store 64 recycles its information continuously round a loop 66 and instructions are entered into the store by way of a channel 67. As each new instruction is read out the contents of a counter 68 are incremented by one unit. When a portion is shown by the display apparatus 63 which it is required to correlate with an item displayed by a display apparatus 70, a light pen 71 is held adjacent to the portion and as a result the contents of the counter 68 corresponding to the portion selected are copied into a holding circuit 72. The display apparatus 70 is similar to the apparatus 63 and functions in conjunction with an address circuit 73 and a store 74. As each time is displayed a counter 75 is incremented. After being copied into the circuit 72 the contents of the counter 68 are passed to a register 76 where they are held and compared with the changing contents of the counter 75. A comparator 77 emphasises a portion of the display shown by the apparatus 70 when the contents of the register 76 and those of the counter 75 are equal and thus a special transform is achieved between a position in the store 64 corresponding to the data item selected by the pen 71 and the store position in the store 75 giving rise to the data item which is emphasised.

Where a store position to spacial co-ordinate transformation is required, the number selected by the pen 71 and held in the register 76 may be divided by a logic circuit 78 (see FIG. 9) into two portions one specifying an X co-ordinate and one specifying a Y co-ordinate. These two signals are then passed to an XY plotter 79 to plot a point on a chart held by the plotter, the chart designating areas related to the display shown by the display 63 so that a special transform is carried out.

Apparatus for carrying out store position to store position transformations in an alternative way is shown in FIG. 10 and comprises two display apparatus 81 and 82 which operate in the way described in connection with FIG. 1 and FIG. 5 except that no counter is provided. Briefly, each time a clock pulse from a generator 83 reaches the stores 84 and 85 instructions are read out and control portions of what are shown by apparatus 81 and 82 respectively. A light pen is used in conjunction with the circuit 81 to select a portion of the display generated by the apparatus 81. The pulse produced by the light pen is supplied directly to the display 82 where it modulates the intensity of that display. Hence when an item in the store 84 is selected using the light pen 86 to indicate the corresponding display portion, the portion of the display shown by the apparatus 82 which is emphasised, corresponds to the data item read out from the store 85 at the same time as the selected data item is read from the store 84.

As has been mentioned where several data items are used in forming a display portion which is to be emphasised one or more of the least significant figures in the counter 12 may be omitted in making the comparison so that the display resulting from a group of data items is emphasised. Two other ways of obtaining such flexibility will now be described in connection with FIG. 6 but with the register replaced with a counter. The data items are divided into groups which are usually of varying sizes and each of which relates to a portion of a display which is to be emphasised at one time. The first data item in each group contains one bit, usually the first, which is a 1 but the remaining data items in that group have 0 as this bit. The counter is then connected to receive an increment each time this bit is a 1 and thus the contents only increase at the beginning of each group of data items and emphasis is continued while the data items in that group control the display.

Instead each group of data items may be preceded by one data item forming a code signifying the beginning of a group. Instructions read from the store 10 pass first to a code detector and then to the circuits 55, 56 and 42 unless the code signifies the beginning of a group when the counter is incremented by 1.

It will be appreciated that while the invention has been described specifically in terms of items of special purpose hardward one or more of these items may be replaced by a suitably programmed computer, and in fact the whole apparatus of the invention may consistute an appropriate computer installation with peripheral equipment when the computer is suitably programmed.

Although in the embodiments described the stores have been indicated as being of the type which continuously circulates the stored information, other types of stores such as a core store may be used. In this case the circuit 54 addresses the next location in the store rather than causing the next item in the circulated information to be read out.

In the embodiments of FIGS. 1 and 5 the number held by the counter 12 may be used by the address circuit 54 to address the store, instead of receiving a pulse which advances the address by a unity increment.

I claim:

1. Apparatus for carrying out spatial transforms, including a store for data, display means, coupled to the store, for serially receiving items of data from the store and providing a display in accordance with the items received, each item being sufficient to allow the display means to provide a portion of the display, means for identifying the items of data by providing an identifying signal associated with each item, input means for generating signals representing the co-ordinates of selected points in a multi-dimensional region, comparison means for comparing the signals representing the co-ordinates with the identifying signals to indicate if a predetermined correlation exists, and means, coupled to the comparison means, for emphasising those portions of the display displayed in accordance with items of data having the predetermined correlation with current signals derived from co-ordinates.

2. Apparatus according to claim 1 wherein the input means includes means for providing a number of first and second digital signals, one first and second signal for first and second coordinates, respectively, of each selected point, and means for concatenating the first and second digital signals relating to each point to form the signals representing the coordinates of that point as a further digital signal in which the first and second digital signals appear one after another, and the means for identifying the items of data in operation provides identifying signals in the form of a pulse each time a portion of the display is provided, and includes a counter for counting the pulses, the comparison means being constructed to indicate the predetermined correlation whenever the contents of the counter equal one of said further digital signals.

3. Apparatus according to claim 2 wherein the means for concatenating the digital signals omits at least the least significant digit of each said first and second digital signal in forming each further digital signal.

4. Apparatus according to claim 2 wherein, in operation, the means for identifying items of data includes a clock pulse generator coupled to the store to cause one of the data items to be read out each time a clock pulse occurs, each clock pulse also being applied to the counter as the identifying signal for the data item which was read out on the occurrence of that clock pulse.

5. Apparatus according to claim 2 wherein each item of data stored includes a digital code marking the occurrence of that item, and the means for identifying items of data includes means for recognising that code and, on recognition, applying a pulse to the counter.

6. Apparatus according to claim 5 wherein the display means and means for identifying items of data are constructed to operate from data items made up from a variable number of multi-bits words in which the said code appears at a predetermined bit position, each data item containing information for a complete unit of the display.

7. Apparatus according to claim 1 for use where each item of data includes a digital code identifying that item, wherein the means for identifying items of data includes a holding store for holding the digital code for the data item determining the current display portion, the input means includes means for providing a number of first and second digital signals, one first and second signal for each coordinate of each selected point, and means for concatenating the first and second digital signals relating to each point to form the signal representing the coordinates of that point as a further digital signal in which the first and second digital signals for that point appear one after another, and the comparison means is constructed to indicate the predetermined correlation when the contents of the holding store equal a said further digital signal.

8. Apparatus according to claim 7 wherein the means for concatenating the digital signals omits at least the least significant digit of each first and second digital signal in forming each further digital signal.

9. Apparatus according to claim 1 wherein the input means includes a graphical input device.

10. Apparatus according to claim 9 wherein the graphical input device includes a planar area having means for designating portions of the area, and means for manually indicating by means of a pointer, the said selected points in the area.

11. Apparatus according to claim 9 wherein the graphical input device includes a cathode ray tube, means for causing the tube to provide a display designating areas of the tube face, and means for manually indicating the said selected points in the display.

12. Apparatus according to claim 11 wherein the cathode ray tube is a storage tube, and the means for manually indicating selected points includes a continuously refreshed cursor and means for moving the cursor in accordance with manual controls.

13. Apparatus according to claim 2 wherein the display means includes a cathode ray tube, refresh means are provided for causing the store to pass groups of data items for a display repeatedly to the display means in order to constantly refresh the display provided by the cathode ray tube, and means are provided for resetting the counter each time a group of data items has been passed to the display means.

14. Apparatus according to claim 2 wherein the display means includes a cathode ray tube, the store includes a plurality of stages each capable of storing information and the store, in operation, circulates data items continuously through its stages and, means are provided for resetting the counter each time the data items in the store have circulated through the stages.

15. Apparatus according to claim 2 wherein the data items are read from the store once only in forming each display, the means for identifying the items of data provides each identifying signal immediately before the associated item is displayed, in order to allow a portion to be emphasised when it is displayed if the predetermined correlation exists.

16. Apparatus according to claim 2 wherein the means for emphasising portions does so by brightening the emphasised portion in relation to the rest of the display.

17. Apparatus for carrying out spatial transforms, including a first store for data, first multi-dimensional display means, coupled to the store, for receiving items of data from the store and providing a first display in accordance with the items received, at least one further multi-dimensional display means for providing a further display which is different from the first display, but is related thereto, selection means for selecting one portion of one of the displays, correlation means for determining which portion if any, of at least one of the other displays has a predetermined correlation with a portion of the said one display selected using the selection means, and means, coupled to the correlation means, for emphasising any portion of the said one other display which has the predetermined correlation with a selected portion of the said one display.

18. Apparatus according to claim 17 wherein the selection means is constructed to select one portion of the first display, the correlation means includes means, coupled to the selection means for holding a signal identifying the item of data giving rise to the selected portion, and the emphasis means is coupled to the correlation means to emphasise a portion of at least one of the further displays determined by the signal held.

19. Apparatus according to claim 17 including a further store for storing items of data from which the further display is formed wherein the correlation means includes a clock pulse generator coupled to the first store and the further store to provide clock pulses each of which causes the first and further stores to each pass an item data to the first and further display means, respectively, and the emphasis means is constructed to emphasise that portion of one display resulting from the item of data read from one store at the same time as the item of data giving rise to the said selected portion of another display.

20. Apparatus according to claim 17 including a further store for storing items of data from which the further display is formed, and first and second means for identifying data items from the first and further stores, respectively, by generating first and second series of identifying signals, each identifying signals being associated with one data item, wherein the selection means is constructed to hold a selected identifying signal from one series corresponding to a selected portion of one display, the correlation means compares the selected identifying signal from the one series and the current identifying signal from the other series, and the emphasis means is constructed to emphasise that portion of the other display display resulting from that data item which is associated with an identifying signal which has the predetermined correlation with the selected identifying signal.

21. A method for carrying out spatial transforms, including forming a display from items of data received serially, each item being sufficient to allow a portion of the display to be formed, identifying each item of data, generating signals representing the co-ordinates of a point in a multi-dimensional region, comparing the identity of each item with the co-ordinate signals, and emphasising those portions of the display resulting from items of data which have a predetermined correlation with the co-ordinate signals for the said point.

* * * * *